Patented Nov. 25, 1952

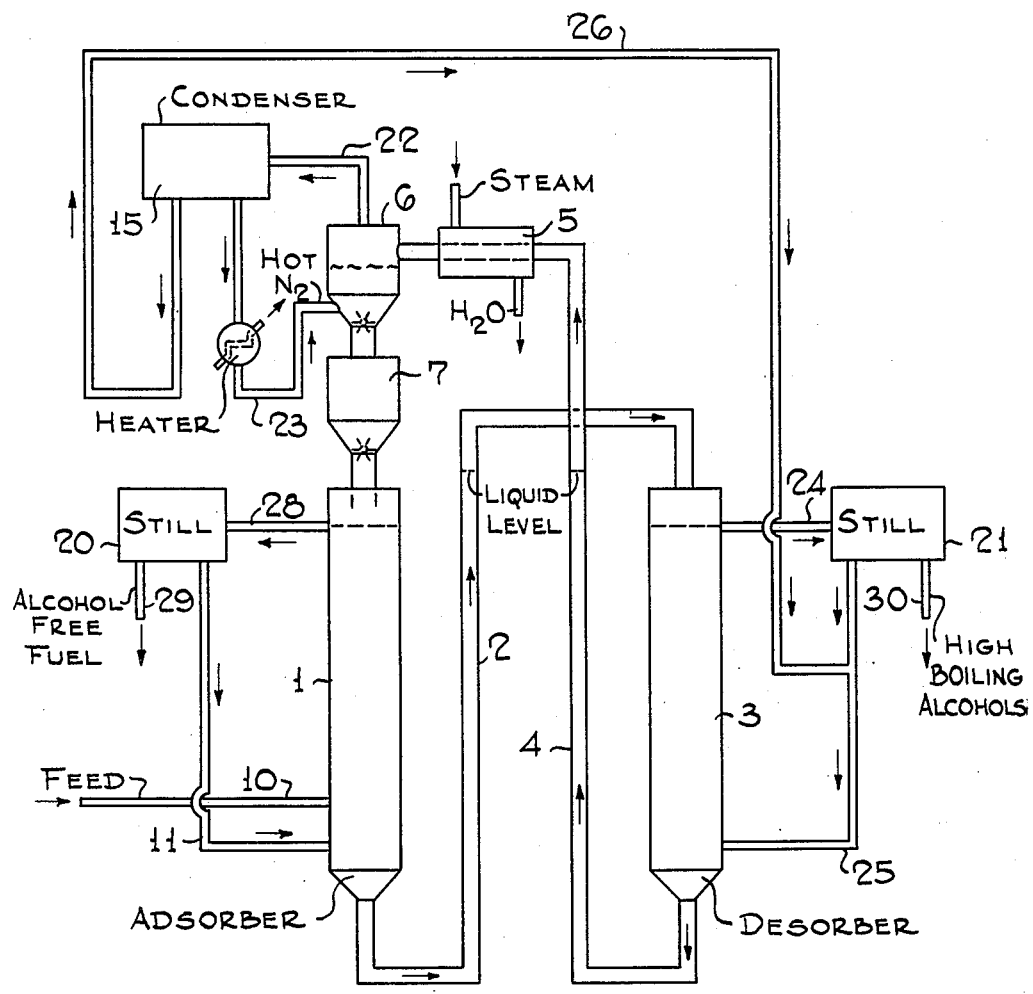

2,619,497

UNITED STATES PATENT OFFICE 2,619,497

RECOVERY OF HIGH BOILING ALCOHOLS BY ACTIVATED ALUMINA

William G. Hockberger, Baton Rouge, La., assignor to Standard Oil Development Company, a corporation of Delaware Application May 6, 1948, Serial No. 25,492

2 Claims. (Cl. 260—450)

This invention relates to an improved method of recovering oxygenated compounds from petroleum oils. More particularly, it relates to an efficient commercially feasible process for the adsorption and recovery of oxygenated products and especially alcohols present in small quantities in synthetic oil fraction boiling in the gasoline-kerosene-diesel oil range.

Hydrocarbon synthesis reactions are performed by contacting hydrogen and oxides of carbon with catalysts under various temperature and pressure conditions. The temperatures employed vary widely, as for example, in the range from about 400° F. to about 800° F. and are generally in the range from 500° to about 700° F. The particular temperature employed depends upon, among other factors, the type of non-gaseous hydrocarbon product desired, the character and the activity of the particular catalyst utilized, the throughput and composition of the synthetic gases and upon the reaction pressure. The pressures, likewise, vary considerably and are a function of other operative conditions such as catalyst employed, activity of the catalyst, character of the feed gases and the temperatures utilized. Operations such as described are generally conducted under conditions to secure the maximum yield of hydrocarbon constituents containing 4 or more carbon atoms in the molecule. However, under the conditions of the operation, various side reactions occur which result in the production of valuable oxygenated compounds.

The proportion of the type products obtained thus vary with the conditions. In all cases, however, vapor products removed from the reaction zone are condensed and segregated into an oil phase and an aqueous phase.

The synthetic naphtha and gas oil fractions having from 4 to 20 carbon atoms and boiling as high as 700° F. are thus found in the oil phase.

These petroleum fractions, synthesized from carbon monoxide and hydrogen, contain various oxygenated compounds, aromatic hydrocarbons and non-aromatic hydrocarbons. The oxygenated compounds include a wide variety of types, such as acids, alcohols, esters, ketones and aldehydes. These latter materials are valuable products when segregated, but many of them are detrimental to fuel quality; and if not recovered, would have to be converted to other materials by dehydration or cracking. Aromatic hydrocarbons are valuable components of fuels, but are undesirable diluents of oxygenated compound products.

Silica gel, a well-known adsorbent, has a relatively high adsorptive attraction for oxygenated compounds and for aromatic hydrocarbons as compared with its attraction for other types of hydrocarbons. A mixture of oxygenated compounds, aromatic hydrocarbons and non-aromatic hydrocarbons is separated by silica gel into two fractions, one of which comprises the oxygenated compounds and aromatics and the other which comprises the non-aromatic hydrocarbons.

Since however, the aromatic hydrocarbons are valuable fuel constituents, the removal of those compounds from the fuel is highly undesirable. In addition, the separation of the oxygenated compounds from the aromatic hydrocarbons as individual fractions can be accomplished with silica gel only by relatively difficult techniques limited to laboratory scale operations and with loss in selectivity in quantitative separations.

One of the objects of this invention is to provide a method for the selective adsorption of the oxygenated compounds from these fuel fractions with minimized adsorption of the aromatic hydrocarbons.

Another object is to provide a method for the selective adsorption and recovery of specific types of oxygenated compounds, i. e., alcohols from these fuel fractions.

It has now been found that an adsorption process utilizing solid adsorbents containing high proportions of alumina are ideally adapted to attain the before-mentioned objects.

These alumina adsorbents do not adsorb the aromatic hydrocarbon and their action is selective for the oxygenated compounds.

Aluminum hydrates such as mono- and trihydrates, and alumina in gelatinous form having a proportion of free or loosely held water associated with it, develop adsorptive properties (i. e., are activated when heated at relatively high temperatures such as those in the range of 480 to 1475° F.). After the resultant bodies have been used as adsorbents, the adsorbed material can be removed from them, usually by heating at a temperature sufficient to drive off the adsorbed material or by washing or other means, the result in any event being to again render the bodies active and suitable for further adsorption. For convenience, such activated and reactivated bodies are referred to herein, and defined in the appended claims as active alumina.

Various commercial adsorbent catalysts containing high proportions of active alumina can thus be used. The preferred range for the active alumina content in these catalysts is from 50 to 100%.

Active alumina type adsorbents may be handled by the same methods used for silica gel separations of aromatic from non-aromatic hydrocarbons.

This invention will be better understood by reference to the following flow diagram:

The feed contemplated in the following description is a diesel fuel that has been pretreated to remove other types of oxygenated compounds such as acids, esters, carbonyls and contains high boiling alcohols which are to be recovered.

The active alumina circulates continuously downward through the adsorber 1 up through a mechanical conveyor 2 downward through the desorber 3 upward by mechanical conveyor 4 through heater 5 to separator hopper 6 to cooling and storage hopper 7 and back to the adsorber 1.

As the active alumina circulates, it adsorbs alcohols from the feed which enters adsorber 1 through line 10 and is displaced free of non-adsorbed feed by hexane which enters adsorber 1 through line 11 and then is drained relatively free of hexane as the conveyor takes the alumina to the desorber 3. Alcohol-free fuel and hexane leave the adsorber 1 through line 28 to still 20. Still 20 separates the alcohol-free fuel from the hexane and the hexane is recycled to the adsorber 1 through line 11. The alcohol-free fuel is taken off through line 29.

The adsorbed alcohols are desorbed by the ethanol in desorber 3. Excess ethanol drains as the conveyor lifts the alumina. Excess ethanol and the desorbed higher alcohols are taken off through line 24 to still 21 which separates the ethanol from the higher boiling alcohols. The ethanol is recycled to the desorber 3 through line 25 and the higher alcohols are taken off through line 30. Some hexane is carried over to the desorber 3 and from time to time it is necessary to remove hexane-ethanol mixture from the desorber system for separation and return of all of the individual components to the respective systems.

The alumina with adsorbed ethanol is conveyed to the heater 5 in which the alumina is heated to approximately 300° F. with consequent vaporization of the adsorbed ethanol. Hot nitrogen is blown through the separator hopper 6 through line 23 to sweep ethanol vapors out through line 22. The ethanol vapors are condensed in condenser 15 and recycled to desorber 3 through lines 26 and 25. The nitrogen used to sweep ethanol vapors out of hopper 6 to condenser 15 is reheated and recycled back to hopper 6 through line 23.

The ethanol-free alumina flows downward to storage hopper 7 in which heat is lost so that relatively cool reactivated alumina is finally delivered to the top of adsorber 1.

The overall effect is to separate the diesel fuel feed into a higher alcohol fraction and an alcohol-free fuel.

The feed being treated in the adsorber is maintained in the liquid phase by being heated to temperatures below 300° F. and preferably below 120° F.

The term, higher boiling alcohols, connotes those alcohols boiling in the boiling point ranges of the hydrocarbon fractions being treated by the method of this invention.

The alcohols that may be used as desorbers are the lower boiling alcohols such as methanol, ethanol, and isopropanol depending on the boiling points of the alcohols to be desorbed.

The liquids that may be used to displace the non-adsorbed feed from the alumina include all those that are easily separable from the feed by distillation and preferably do not desorb the adsorbed higher alcohols. Among such liquids are hexane and isohexane.

Experimental data were obtained utilizing the process of this invention and are presented below:

EXAMPLE I

A known mixture was made up containing 20 volumes of $C_9$ alcohols, 20 volumes of a $C_{10}$ aromatic tetrahydronaphthalene, and 60 volumes of $C_{12}$ paraffins, all of which boil in the range of 350–375° F. and therefore are relatively difficult to separate by distillation methods alone. Approximately 200 cc. of the mixture was diluted with 200 cc. of isohexane and percolated through a vertical glass tube of one-inch diameter by eight feet long packed with 50–200 mesh active alumina. The materials were at room temperature of 90–95° F. Isohexane was added until the liquid leaving the bottom of the tube had the same refractive index as the isohexane, at which time the filtrate cuts were grouped as a first fraction, while all succeeding filtrate cuts were accumulated as the second fraction. Three liters of ethanol were added to the column to desorb and flush out adsorbed materials. The second fraction was distilled to remove the isohexane and ethanol. The fraction thus obtained amounted to 20% by volume of the mixture originally charged to the alumina which was exactly the same as the percentage of $C_9$ alcohols known to be in the mixture. Inspection of the fraction showed an A. P. I. gravity of 37.2 (versus 38.7 for the $C_9$ alcohols) and a refractive index, $n_D^{20}$ of 1.43319 (versus 1.43182 for the $C_9$ alcohols). This demonstrated the selectivity with which alcohols can be separated from aromatics by selective adsorption upon active alumina.

To further demonstrate the effectiveness of the separation, the filtrate cuts set aside as the first fraction were percolated in their original order through silica gel in a tube approximately 1.75 inches in diameter by four feet long. Isohexane and ethanol were added as in the first percolation step, and the fractions recovered corresponded in yield and in inspection to the $C_{10}$ aromatic and $C_{12}$ paraffins known to be present in the mixture:

| | $C_{10}$ Aromatics | | $C_{12}$ Paraffins | |
|---|---|---|---|---|
| | Original | Recovered | Original | Recovered |
| Proportion, volume percent | 20.0 | 18.3 | 60.0 | 59.5 |
| Gravity, ° A. P. I. | 14.3 | 14.6 | 57.0 | 57.0 |
| Refractive Index, $n_D^{20}$ | 1.54177 | 1.53736 | 1.41896 | 1.41873 |

The original $C_9$ alcohol, $C_{10}$ aromatic, and $C_{12}$ paraffins differed widely in A. P. I. gravity (38.7 vs. 14.3 vs. 57.0) and the gravities of the recovered fractions showed a like trend (37.2 vs. 14.6 vs. 57.0).

EXAMPLE II

The process of adsorptive extraction was carried out with a 350–500° F. boiling range fraction produced from carbon monoxide and hydrogen in the hydrocarbon synthesis process. The technique used was essentially the same as described in Ex. I. The proportion of alumina to sample (365 cc. of alumina per 100 g. of sample) was insufficient for complete removal of oxy-compounds, but the character of the separation was demonstrated as shown by the following data which express the relative quantities of oxy-compounds in terms of the oxygen contained. The quantities not desorbed by ethanol have been estimated by difference and are shown in the fourth column (Retained on Alumina).

*Removal of oxy-compounds by alumina*

350–500° F. FRACTION OF PRODUCT SYNTHESIZED FROM CARBON MONOXIDE AND HYDROGEN

| Chemical Analysis | Grams of oxygen per 100 grams of total sample | | | |
|---|---|---|---|---|
| | Total Sample | Filtrate Fraction | Desorbed Fraction | Retained on Alumina |
| Oxygen as Acids | 2.70 | 0.00 | 0.03 | 2.67 |
| Oxygen as Esters | 1.79 | 0.83 | 0.04 | 0.92 |
| Oxygen as Carbonyls | 0.39 | 0.03 | 0.06 | 0.30 |
| Oxygen as Alcohols | 0.57 | 0.06 | 0.82 | ---------- |
| Oxygen as Acetals | 0.34 | 0.00 | 0.18 | 0.16 |
| Total Oxygen | 5.79 | 0.92 | 1.13 | 4.05 |
| Combustion Analysis: Total Oxygen (By difference) | 5.7 | 0.92 | ---------- | ---------- |

Acids were completely removed but were not desorbed under the conditions of the experiment. Esters and carbonyls were not completely adsorbed, but those which were adsorbed were not easily desorbed. Alcohols were recovered in greater quantity than was indicated for the original sample, indicating possible decomposition of acetals and/or esters. These data indicate that the adsorptive separation process of this invention is most useful for the recovery of alcohols. It appears advantageous to pretreat the feed to remove oxy-compounds other than alcohols such as by caustic treating and redistillation or to convert all the oxy-compounds to alcohols by a suitable hydrogenation step.

EXAMPLE III

The third experiment repeated the second with a sample of wider boiling range (350–650° F.) and with a somewhat greater ratio of alumina to sample (700 cc. of alumina per 100 g. of sample) in order to assure more nearly complete removal of oxy-compounds. The results obtained were as follows:

*Removal of oxy-compounds by alumina*

350–650° F. FRACTION OF PRODUCT SYNTHESIZED FROM CARBON MONOXIDE AND HYDROGEN

| Chemical Analysis | Grams of oxygen per 100 grams of total sample | | | |
|---|---|---|---|---|
| | Total Sample | Filtrate Fraction | Desorbed Fraction | Retained on Alumina |
| Oxygen as Acids | 2.17 | 0.00 | 0.08 | 2.09 |
| Oxygen as Esters | 1.10 | 0.15 | 0.23 | 0.72 |
| Oxygen as Carbonyls | 0.32 | 0.00 | 0.00 | 0.32 |
| Oxygen as Alcohols | 0.60 | 0.17 | 0.94 | ---------- |
| Oxygen as Acetals | 0.31 | 0.00 | 0.10 | 0.21 |
| Total Oxygen | 4.50 | 0.32 | 1.35 | 3.34 |
| Combustion Analysis: Total Oxygen | 4.6 | 0.35 | 1.9 | ---------- |

Small discrepancies among the above values are within the experimental error inherent in the analytical methods and do not detract from the obvious conclusion that oxy-compounds are selectively adsorbed by activated alumina. In the second and third experiments described above, further separations with silica gel yielded aromatic fractions amounting respectively to 29.4 and 28.4 grams per 100 grams of original sample, proving that in each case the alumina was adsorbing oxy-compounds selectively in the presence of aromatic as well as non-aromatic hydrocarbons.

In the third experiment, alumina percolation effected improvement in the quality of the fraction (which boiled in the diesel fuel range) by reducing the acid number from 38.0 mg. KOH/g. to zero and by increasing the cetane number from 37 to 49. Commercial light diesel fuels are required to have an acid number below 0.6 mg. KOH/g. and a cetane number of 50 or higher.

It is to be understood that the invention is not limited to the specific examples which have been offered merely as illustrations and that modifications may be made within the scope of the claims without departing from the spirit of the invention. Thus, for example, this method can be applied to the purification of a gasoline fraction boiling in the range of 115 to 450° F.

Such modifications are readily apparent to one skilled in the art. For example, the adsorbent may be disposed as a stationary granular bed, as a moving column of granular material, or as a so-called fluid powder. The fundamental requirements are simply intimate contacting of the sample with active alumina-type adsorbent in sufficient proportions to adsorb the quantities of oxy-compound present in a liquid phase at moderate to low temperatures together with means for desorbing the oxy-compounds and re-activating the adsorbent. Counter-current contacting increases the efficiency with which the adsorbent is employed. The recovery of total oxy-compounds depends upon the development of improved desorption methods involving high temperatures and/or special solvents such as appear possible in view of general knowledge relating to selective adsorption. The process is directly applicable for the recovery of alcohols, in which case it is desirable to remove interfering acids, esters, and so forth by a preliminary caustic treatment or to convert such interfering materials to alcohols or hydrocarbons by a process such as high pressure hydrogenation.

What is claimed is:

1. A process for selectively separating and recovering high-boiling alcohols present in a predominantly hydrocarbon mixture boiling between 350° F.–500° F., and containing other organic oxygenated compounds including esters, acetals, and acids and aromatic hydrocarbons which comprises contacting said mixture in the liquid phase with an active alumina adsorbent to selectively adsorb the high-boiling alcohols thereon, contacting the adsorbent containing adsorbed high-boiling alcohols and non-adsorbed residual hydrocarbon fraction with an organic liquid to displace the non-adsorbed fraction and then contacting the adsorbent containing the adsorbed high-boiling alcohols with a lower-boiling alcohol to desorb said high-boiling alcohols.

2. A process as in claim 1 wherein the organic liquid utilized to displace the non-adsorbed fraction is iso hexane and the lower-boiling alcohol utilized to desorb the high-boiling alcohols is ethanol.

WILLIAM G. HOCKBERGER.

REFERENCES CITED

The following references are of record in the file of this patent:

UNITED STATES PATENTS

| Number | Name | Date |
|---|---|---|
| 2,398,101 | Lipkin | Apr. 9, 1946 |
| 2,410,642 | Farkas et al. | Nov. 5, 1946 |
| 2,425,535 | Hibshman | Aug. 12, 1947 |
| 2,441,572 | Hirschler et al. | May 18, 1948 |
| 2,457,257 | Michael et al. | Dec. 28, 1948 |
| 2,458,819 | Yowell et al. | Jan. 11, 1949 |
| 2,470,339 | Claussen et al. | May 17, 1949 |
| 2,476,788 | White | July 19, 1949 |
| 2,542,521 | Hibshman et al. | Feb. 20, 1951 |

OTHER REFERENCES

Kittur et al.—Proc. Ind. Acad. Sci., vol. IVA, pages 562–569 (1936).

U. S. Naval Tech. Mission in Europe, Oct. 6, 1945, pages 73–88.

Activated Alumina—pages 25–28 (1939).

Kalichevsky et al., Chem. Refining of Petroleum (1933) pages 168, 169, 173, 174, 175 and 218.

Mair Jour. Res. Nat. Bur. Stand., vol. 34, pages 435, 436, 450 and 451 (1945).